United States Patent [19]

Erickson

[11] Patent Number: 4,736,659
[45] Date of Patent: Apr. 12, 1988

[54] APPARATUS FOR HOLDING A TOOLHOLDER SHANK

[75] Inventor: Robert A. Erickson, Raleigh, N.C.

[73] Assignees: Kennametal Inc., Latrobe, Pa.; Krupp Widia GmbH, Essen, Fed. Rep. of Germany

[21] Appl. No.: 7,309

[22] Filed: Jan. 27, 1987

[51] Int. Cl.⁴ .................... B23B 29/04; B23B 29/34
[52] U.S. Cl. .................... 82/36 B; 82/36 R; 403/322; 407/101; 409/234
[58] Field of Search .............. 82/36 B, 36 R, 36 A; 409/232–234; 408/238, 239 R, 239 A; 279/1 B; 403/322, 324, 374; 407/46, 101

[56] References Cited

U.S. PATENT DOCUMENTS

| 1,119,528 | 12/1914 | Nieman. | |
|---|---|---|---|
| 2,970,844 | 2/1961 | Better | 279/75 |
| 2,990,188 | 6/1961 | Better et al. | 279/75 |
| 3,115,798 | 12/1963 | Donaway | 82/34 |
| 3,498,653 | 3/1970 | McCreery et al. | 287/119 |
| 3,851,562 | 12/1974 | Tomita et al. | 20/11 A |
| 4,018,112 | 4/1977 | Heaton et al. | 82/1 C |
| 4,068,559 | 1/1978 | Schmid et al. | 90/11 D |
| 4,122,755 | 10/1978 | Johnson et al. | 90/11 A |
| 4,131,054 | 12/1978 | Johnson et al. | 90/11 |
| 4,135,418 | 1/1979 | McCray et al. | 82/36 A |
| 4,197,771 | 4/1980 | Heaton et al. | 82/36 B |
| 4,228,705 | 10/1980 | Heisner | 82/36 |
| 4,270,422 | 6/1981 | Andersson | 82/36 R |
| 4,292,866 | 10/1981 | Kaczynski | 82/36 R |
| 4,322,190 | 3/1982 | Anderson | 409/234 |
| 4,350,463 | 9/1982 | Friedline | 409/234 |
| 4,406,195 | 9/1983 | Kruger et al. | 82/36 |
| 4,573,824 | 3/1986 | Ehle | 403/322 |
| 4,575,293 | 3/1986 | Berti | 409/234 |
| 4,604,012 | 8/1986 | Kawasaki et al. | 409/233 |

FOREIGN PATENT DOCUMENTS

| 0061075 | 9/1982 | European Pat. Off. |
| 0123156 | 10/1984 | European Pat. Off. |
| 1333872 | 10/1973 | United Kingdom. |
| 1456611 | 11/1976 | United Kingdom. |
| 2154479 | 9/1985 | United Kingdom. |

Primary Examiner—Gil Weidenfeld
Assistant Examiner—Steven C. Bishop
Attorney, Agent, or Firm—John J. Prizzi

[57] ABSTRACT

In the present invention a tubular toolholder shank is releasably held in the bore of a tool support member by a releasable locking mechanism mounted in the bore of the tool support member and receivable in the tubular toolholder shank. The locking mechanism has an actuating member radially extending through the wall of the tubular shank.

13 Claims, 3 Drawing Sheets

APPARATUS FOR HOLDING A TOOLHOLDER SHANK

BACKGROUND OF THE INVENTION

The present invention relates to mechanisms for releasably holding a first member and a second member together along a longitudinal axis. It is especially concerned with mechanisms for releasably holding a toolholder shank in a support member bore when the mechanism actuating member is transversely aligned with respect to the longitudinal axis of the toolholder shank and support member bore. Such mechanisms and articles are used in the cutting and shaping of workpieces where it is not expedient to use the tool support member in connection with a base member having a bore containing an axially aligned power driven means for axially actuating the locking mechanism in the tool support member.

Examples of toolholders and support members utilizing releasable locking mechanisms having radial activation are shown in U.S. Pat. Nos. 4,573,824; 4,575,293 and 4,135,418.

There is, however, always a need for improved mechanisms in this field. The ideal mechanism should hold the toolholder securely in place and not detract from the basic stiffness of the toolholder. It should be relatively simple in design so as to be manufactured at a relatively low cost. The mechanism should be accessible for radial activation at a point which is as close as possible to the forward abutment face of the tool support member to minimize the length the support member must extend beyond the base member onto which it is to be mounted and thereby maximize the number of applications in which it will be acceptable for use.

SUMMARY OF THE INVENTION

It is believed that the following design meets the foregoing needs. In accordance with the present invention, a locking mechanism for releasably holding a tubular shank in the bore of a tool support member is provided which is easily manufactured, provides a rigid connection between the toolholder and the tool support member and is accessible for activation at a point close to the forward face of the tool support member. The present mechanism includes a stub member for mounting within the bore of the tool support member while also being receivable within the tubular shank of the toolholder, thereby allowing the mechanism to be very close to the forward face of the tool support member. Engaged within the stub member are two locking elements for releasably abutting against the toolholder shank, and an actuating member for actuating these locking elements. The actuating member is reciprocally movable along a first transverse axis and is engaged, preferably nonrotatably, in a passageway within the stub member. Intersecting the passageway are first and second apertures in the stub member circumferentially spaced from each other and radially extending away from the bore wall of the support member along a second radial axis. A locking element is engaged in each aperture and are driven into abutment with the toolholder shank by abutment with the reciprocally movable actuating member.

Preferably, in accordance with the present invention, the actuating member and the tool support member are connected to each other by a connecting member which is preferably a threaded member threadedly engaged with both the tool support member and the actuating member. Rotation of the threaded member in a first direction moves the actuating member in a first direction along the first radial axis thereby driving and holding the locking elements in abutment with the tubular toolholder shank to lock it onto the support member. Rotation of the threaded member in a second direction moves the actuating member in a second direction along said first radial axis to allow for releasing the locking elements in order to remove the shank from the support member.

Also preferably, in accordance with the present invention, the stub member has reciprocally movably engaged in it a pushing member for pushing the toolholder shank forwardly in the bore of the tool support member. The pushing member is actuated by abutment with the actuating member when the actuating member is moved in the second direction to allow for release of the locking elements. This feature is especially valuable where the toolholder shank and support member bore are of such a design that they stick to each other after release of the locking elements.

BRIEF DESCRIPTION OF THE DRAWINGS

The foregoing and other aspects of the present invention will become more apparent upon review of the following detailed description of the invention in conjunction with the drawings which are briefly described below.

DETAILED DESCRIPTION OF THE INVENTION

Figure 1:
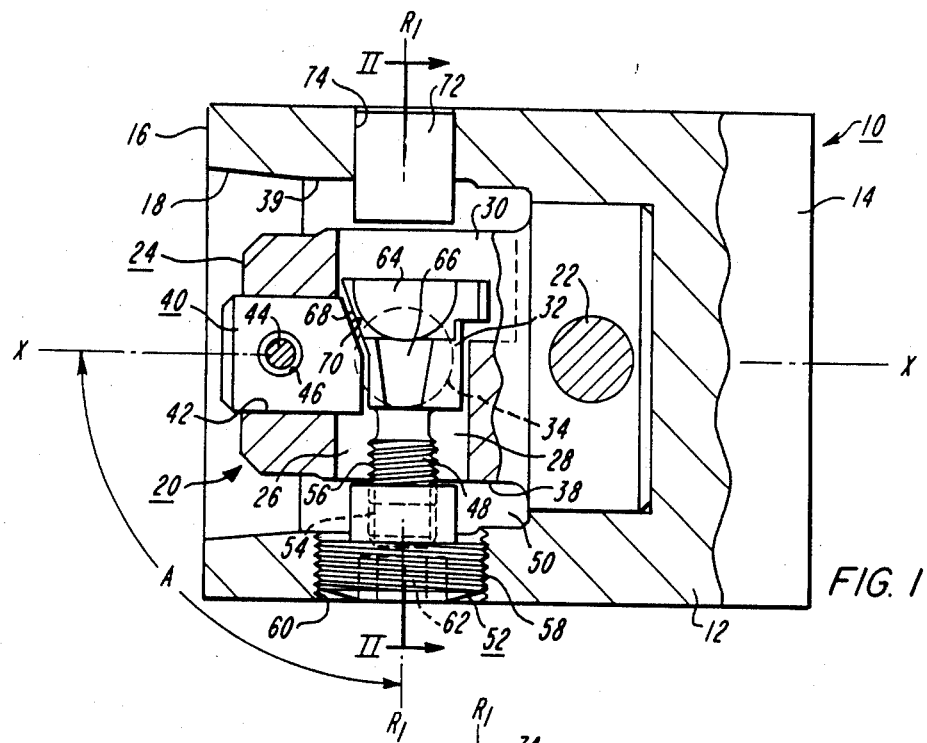
FIG. 1 shows a side view of an embodiment of a locking mechanism in accordance with the present invention in partial cross section.
Figure 2:
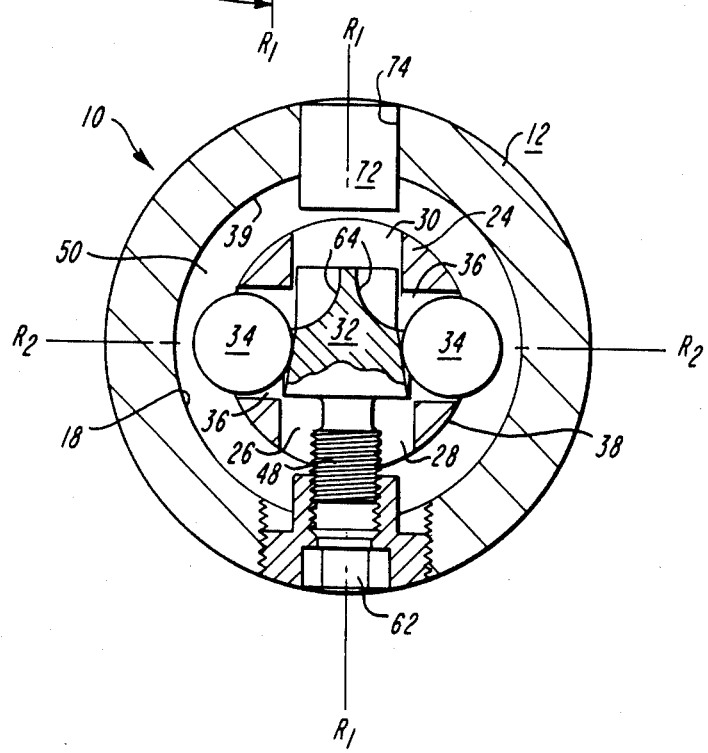
FIG. 2 is a transverse cross section taken along arrows II—II of FIG. 1.

In accordance with the present invention, an embodiment of an apparatus 10 for releasably holding a tubular toolholder shank is shown in FIGS. 1 and 2. The apparatus 10 includes a support member 12 whose exterior may be cylindrical in nature as shown or any other shape as desired. The support member has a rear end 14 for being conventionally received and held in a conventional base member (not shown). On the opposite end of the support member is a forwardly facing surface 16 which is preferably used for abutment with a rearwardly facing abutment face on a toolholder. Intersecting and extending rearwardly from forwardly facing surface 16 symmetrically about longitudinal axis X-X is a bore 18 for receiving the tubular shank of a toolholder.

A releasable locking mechanism 20 is securely held in bore 18 by a first pin member 22 which is engaged in coaxially aligned mounting holes in the stub member 24 and the tool support member 12. The stub member 24 of the releasable locking mechanism 20 has a passageway 26 therein extending transversely with respect to longitudinal axis X-X. Preferably, as shown, passageway 24 extends radially along a first radial axis $R_1$-$R_1$ (i.e., angle A equals 90 degrees) with respect to longitudinal axis X-X. Passageway 26 has a cylindrical portion 28 at one end communicating with an elongated slot portion 30 at its other end. Loosely, but nonrotatably, engaged within passageway 26 so as to be self centering during locking is an actuating member 32 for driving first and second locking elements 34 into abutment with a toolholder shank to releasably lock it onto the support member 12. The first and second locking elements 34 are respectively located in first and second apertures 36 in stub member 24. The first and second apertures 36 extend transversely with respect to the longitudinal axis X-X of the bore 18 and communicate with the outer peripheral surface 38 of the stub member, extending away from it and the bore wall 39 to intersect the passageway 26 containing the actuating member 32. Preferably, these apertures are radial apertures in that they extend radially (i.e., at 90 degrees) with respect to axis X-X. It is also preferred that radial apertures 36 are coaxial with each other extending along and about an axis $R_2$-$R_2$ which is preferably circumferentially spaced at 90 degrees with respect to axis $R_1$-$R_1$. Axis $R_1$-$R_1$ defines an imaginary plane whose normal is axis X-X and which is located forwardly of the rearmost end of the tubular shank when the shank is releasably held in the tool support member. Apertures 36 are preferably cylindrical.

Also engaged in stub member 24 is a pushing member 40 for pushing a toolholder shank forwardly in bore 18. Pushing member 40 is reciprocally engaged in a cylindrical longitudinal aperture 42 and retained there by a second pin member 44 which is tightly held by stub 24 and loosely engaged in a transverse opening 46 through pushing member 40.

One portion 48 of actuating member 32 extends beyond the peripheral surface 38 of the stub member 24 and into the annular space 50 formed between the peripheral surface 38 of the stub 24 and the wall 39 of the bore for receiving the tubular shank of the toolholder. That portion 48 of the actuating member 32 is connected to a connecting member 52 which connects actuating member 32 to the tool support member 12 while also providing the means for activating the reciprocal movement of actuating member 32 along axis $R_1$-$R_1$.

While the connecting member may take many forms, I have found it preferable for it to be a threaded member. As shown in the figures, connecting member 52 has an internally threaded portion 54 which extends into the annular space 50 to threadedly engage threads 56 on the one portion 48 of the actuating member also extending into annular space 50. The connecting member also preferably has an externally threaded portion 58 which is threaded oppositely to the threads on the internal portion 54 and which engage threaded hole 60 in tool support member 12. On the end of the connecting member accessible from the exterior of the tool support member is an hexagonal cross section depression 62 for receiving an Allen Key wrench for rotating connector member 52. When rotated in a first direction, connector member 52 moves the actuating member in a first direction along axis $R_1$-$R_1$ to roll locking elements 34 out of concave spherical depressions 64 and onto concave cylindrical ramps 66 on the actuating member 32. The locking elements are thereby driven radially outwardly along axis $R_2$-$R_2$ through first and second radial apertures 36 to abut against the shank of a toolholder. When the connector member is rotated in a second direction, opposite to the first direction, the actuating member is moved in a second direction, along axis $R_1$-$R_1$, to allow for releasing the locking elements from abutment with the tubular shank via alignment of the concave spherical depressions 64 with radial apertures 36.

In addition, when the actuating member moves in the second direction, a ramp 68 on the side of the actuating member facing forwardly engages a ramp 70 on the pushing member 40 forcing the pushing member forwardly to push the toolholder shank forwardly in the bore.

Support member 12 also contains a key member 72 which preferably extends into annular space 50 for engaging a keyway in the tubular shank to thereby hold the toolholder nonrotatable with the support member. Preferably, key member 72 is press fit into a radial opening 74 in the support member which is located diametrically opposite to the threaded hole 60 containing the connector member 52.

Figure 3:
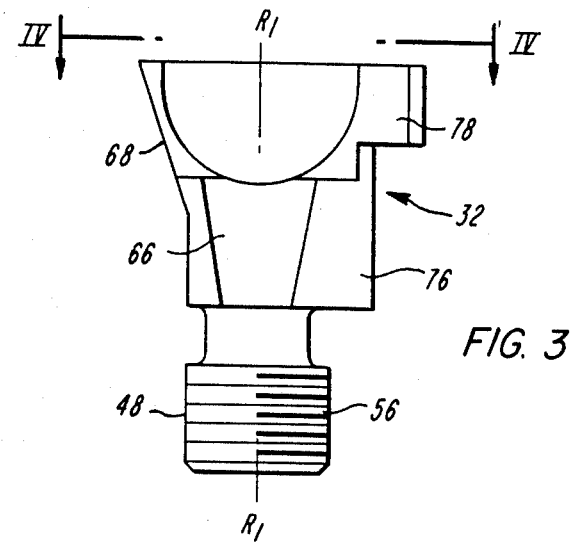
FIG. 3 shows a plan view of the embodiment of the actuating member in accordance with the present invention shown in FIGS. 1 and 2.
Figure 4:
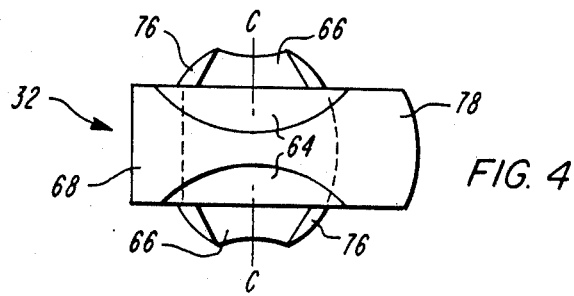
FIG. 4 shows an end view of the actuating member taken along arrows IV—IV of FIG. 3.

Referring now to FIGS. 3 and 4, the details of the actuating member 32 are more clearly apparent. The actuating member has a first portion 48 at one end for connection to the connector member mounted in the support member, preferably by threaded engagement of threads 56 on the actuator and internal threads on the connector member. This first portion 48 is joined to a generally cylindrical second portion 76 which carries oppositely facing concave cylindrical ramps 66 for driving locking elements radially outwardly. These ramps decline inwardly (at an angle B with respect to axis $R_1$-$R_1$) into the body of the actuating member as they extend away from the first portion 48 until they join concave spherical depressions 64 on the third portion of actuating member 32. The third portion is an oblong member 78 whose major dimension extends at right angles to the axis of reciprocal movement $R_1$-$R_1$ of the actuating member and at right angles to the center line of ramps 66 and depression 64. Oblong member 78 serves to hold the actuating member nonrotatable in the passageway by engaging the elongated slot portion of the passageway. Extending from oblong member 78 to the second portion 76 of the actuating member is a ramp 68 which declines inwardly into the body of the actuating member as it extends into the second portion.

While angle B should ideally be as small as possible to maximize mechanical advantage, this ideal configuration must be balanced against the ability to manufacture within a given tolerance and the concern that the shallower B is the longer the stroke required to achieve lock up and the longer the lock rod must be. I have found that setting angle B equal to 20 degrees to be a preferred compromise between these competing concerns, with angle B being equal to 10 to 15 degrees being more preferred.

Figure 5:
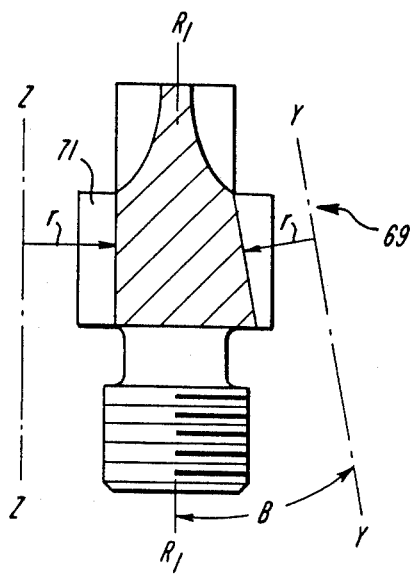
FIG. 5 has an alternative embodiment of an actuating member in partial cross section.

In an alternative embodiment of an actuating member 69, one of the actuating member concave cylindrical ramps has been replaced by a concave cylindrical groove 71 whose axis of rotation Z-Z is aligned parallel to the axis of reciprocal movement $R_1$-$R_1$ as shown in FIG. 5. For a given included angle (here the angle between axis Z-Z and axis Y-Y) this embodiment design provides an increased mechanical advantage with a shorter lock up stroke required compared to the two ramp embodiment having the same included angle formed between the two ramps.

Figure 6:
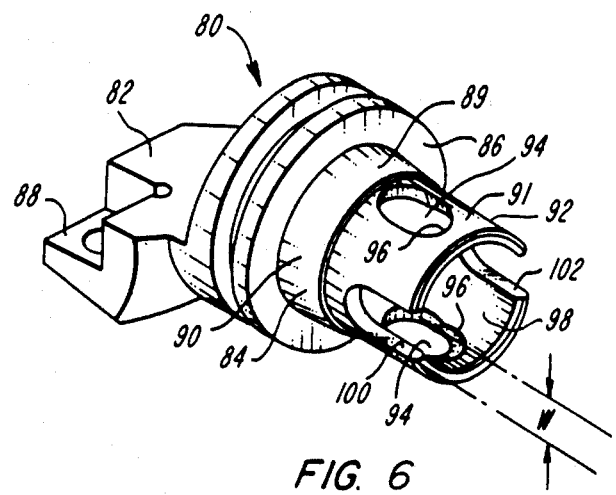
FIG. 6 shows a perspective view of a preferred embodiment of a toolholder for use with the present invention.

While the present invention may be used with a wide variety of toolholders having tubular shanks, it is preferably used with the toolholder 80 shown in FIG. 6. Toolholder 80 has a forward end 82, a shank 84 joining the forward end 82 and a rearwardly facing abutment face 86 at the juncture of the forward end 82 and the shank 84.

The forward end 82 is conventional in nature and has a conventional tool receiving pocket 88 thereon for receiving a conventional shim, indexable cutting insert and locking pin (not shown).

The rearwardly facing abutment face 86 is designed for abutment with the forwardly facing surface 16 of the tool support member 12 on which the toolholder 80 is to be mounted. Rearwardly facing abutment face 86 is preferably planar in nature and preferably defines a plane that is perpendicular to the longitudinal axis of symmetry of the shank 84.

As shown in FIG. 6, the shank 84 is preferably an integral part of the toolholder 80, and is preferably machined from a single piece of steel. However, it is also contemplated that the shank 84 and the forward end 82 of the toolholder may be independent pieces that may be subsequently mechanically joined together with the rearwardly facing abutment face 86 being a part of either the forward end 82 or the shank 84. In this manner, a single shank may be utilized with a variety of different toolholder forward ends or other tool components.

The shank 84 is at least partially and preferably totally tubular in nature. The outer surfaces of the shank 84 may be divided into two sections. The first section 89 has a first surface of revolution 90 about the longitudinal axis of symmetry which faces radially outwardly and tapers inwardly while extending rearwardly. As shown in this figure, preferably this first surface of revolution is conical in nature.

Rearwardly of and joined to the first section of the shank 84 is a second section 91 which is tubular in nature. The second section has an outer surface which is a second surface of revolution 92 located rearwardly and inwardly of the first surface of revolution 90. The second surface of revolution 92 is preferably coaxial with the first surface of revolution 90 and is preferably cylindrical.

The tubular wall of the second section 91 of the shank is perforated by a first and a second perforation 94 which are circumferentially spaced from each other, preferably at 180 degrees to each other. The first and second perforations 94 respectively contain a first and a second forwardly facing concave abutment surface 96 which extend forwardly while extending radially away from the inner surface 98 of the shank.

Circumferentially spaced between perforations 94 are slots 100 and 102 on the end of the tubular shank 84 and which interrupt the second surface of revolution 92. Slot 100 is designed to serve as a keyway to accept key 72 in the tool support member bore 18 and thereby hold the toolholder nonrotatable with respect to the tool support member 12. The width, w, of slot 100 is dimensioned to provide a slip fit with key 72. The width of slot 102 is dimensioned to loosely accept connecting member 52 and thereby not hinder the rotation of connecting member 52.

Figure 7:
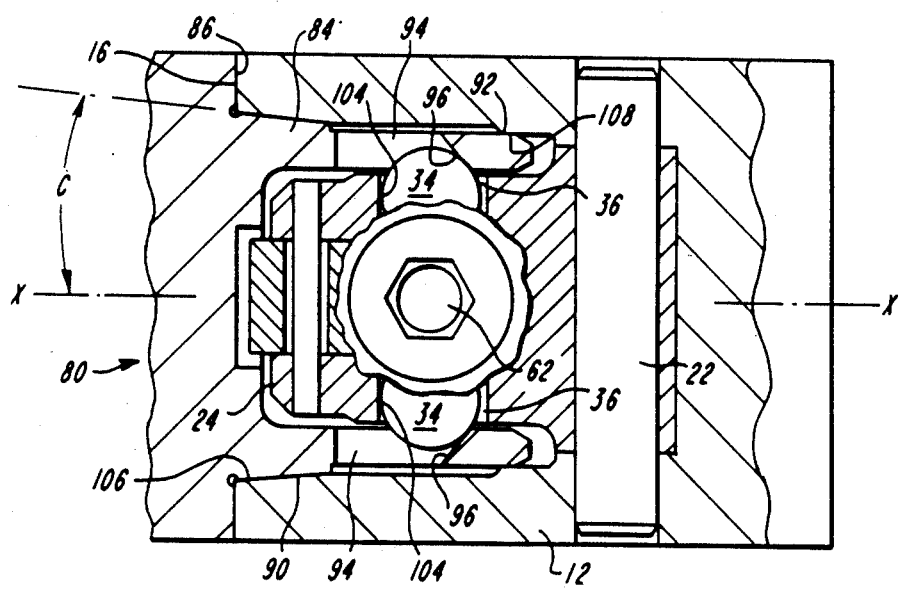
FIG. 7 shows a cross section of the embodiment shown in FIG. 1 viewed at 90 degrees to the view shown in FIG. 1 and containing the tubular shank of the toolholder shown in FIG. 6.

Now referring to FIG. 7, in accordance with the present invention, the toolholder 80 is resiliently mounted (i.e., locked up) on the tool support member 12 via locking elements 34. These locking elements 34 preferably are two spherical balls (i.e., spheres) which are held partially within the perforations 94 by the actuating member nonrotatably contained within the passageway in stub 24.

As the locking balls are moved outwardly by ramps 66, they are driven into abutment with the forwardly facing concave abutment surfaces 96 in perforations 94 and rearwardly facing concave surfaces 104 in the radial apertures 36 of the stub 24. In this manner, a force having both a rearward and a radially outwardly component is directed against the shank 84 of the toolholder 80 which has been inserted into the bore 18 of the tool support member 12. The rearward component of this force forces the first surface of revolution 90 into an interference fit with the bore's forward surface of revolution 106 about longitudinal axis X-X. The forward surface of revolution 106 faces radially inwardly and tapers radially inwardly while extending rearwardly and as shown in the figure is preferably conical and tapers inwardly at the same angle as found on the first surface of revolution 90 of the shank. Preferably, this angle is between 2 to 10 degrees to provide a self-sticking taper. Most preferably, a Morse taper is utilized (i.e., 5 degrees, 43 minutes and 30 seconds).

As the shank's first surface of revolution 90 and the bore's forward surface of revolution 106 are being resiliently interference fit together, the rearwardly facing face 86 of the toolholder is being forced into abutment with the forwardly facing surface 16 of the tool support member 12.

The radially outward component of the force directed against shank 84 resiliently expands the portion of the second surface of revolution 92, preferably located rearwardly of the first and second forwardly facing concave abutment surfaces 96 into abutment with the bore's radially inwardly facing rear surface of revolution 108 about the longitudinal axis X-X. This bore surface 108 is preferably concave cylindrical to assure more complete abutment with the convex cylindrical surface 92 of the shank. Preferably, the diameter of the bore surface 108 is about 0.002 to 0.004 inches greater than the outer diameter of the second surface of revolution 92 in its unexpanded state.

As shown in FIGS. 1, 2 and 6, the stub 24 is engaged in the bore of the tool support member and held stationary by first pin member 22. The actuating member 32 and the locking elements 34 are loosely engaged in the stub passageway 26 and radial apertures 36 respectively so as to be self centering during locking. In the absence of a toolholder shank, the locking elements are loosely retained in their respective apertures by the actuating member 32 and the bore wall 39. The outside diameter of the stub 24 at its radial apertures 36 has been selected such that the difference between it and the diameter of the support member bore is small enough to assure that any locking element sticking out of a radial aperture 36 will be pushed into the aperture by the rearmost end of shank 84 as it is inserted into the bore and over the stub.

All concave surfaces used for abutment with locking elements 34 during locking of the toolholder shank preferably have a radius of curvature, r, that is at least equal to, but no greater than, 0.004 inches, and more preferably 0.002 inches, larger than the radius of curvature of the locking elements 34.

As can be clearly seen in FIG. 6, the activation point 62 for the actuator member is located forwardly of the rearmost end of the shank.

Additional aspects of the toolholders, support members and other members described herein and alternative embodiments thereof are described in my copending, concurrently filed application Ser. No. 7,169. This application is hereby incorporated by reference in its entirety.

Changes and modifications in the specifically described embodiments can be carried out without departing from the scope of the invention which is intended to be limited only by the scope of the appended claims.

What is claimed is:

1. An apparatus for releasably holding a tubular toolholder shank, said apparatus comprising:
   a tool support member having a forwardly facing surface and a bore intersecting said forwardly facing surface and extending rearwardly therefrom for receiving said tubular toolholder shank;
   a means for releasably locking said tubular toolholder shank into said tool support member, located within said bore and receivable in said tubular toolholder shank;
   said means for locking having a stub member having a passageway therein extending radially along a first radial axis with respect to the longitudinal axis of said bore;
   said stub member having a first aperture and a second aperture circumferentially spaced from said first aperture, and said first and said second apertures radially extending away from the bore wall along a second radial axis and intersecting said passageway;
   a first locking element and a second locking element for releasably abutting with said tubular toolholder shank to releasably lock said tubular toolholder shank onto said support member, respectively located in said first and second apertures;
   and a means for actuating said first and said second locking elements through abutment therewith, reciprocally movable along said first radial axis and engaged in said passageway.

2. The apparatus according to claim 1 wherein:
   said means for actuating is held nonrotatably within said passageway.

3. The apparatus according to claim 1 further comprising:
   a means for threaded engagement with said tool support member and said means for actuating connecting said tool support member to said means for actuating, whereby rotation of said means for threaded engagement in a first direction moves said means for actuating in a first direction along said first radial axis for driving said locking elements into abutment with said tubular toolholder shank, and whereby rotation of said means for threaded engagement in a second direction moves said means for actuating in a second direction along said first radial axis to allow for releasing said locking elements from abutment with said tubular toolholder shank.

4. The apparatus according to claim 2 further comprising:
   a means for threaded engagement with said tool support member and said means for actuating, said means for threaded engagement connecting said tool support member to said means for actuating, whereby rotation of said means for threaded engagement in a first direction moves said means for actuating in a first direction along said first radial axis for driving said locking elements into abutment with said tubular toolholder shank, and whereby rotation of said means for threaded engagement in a second direction moves said means for actuating in a second direction along said first radial axis to allow for releasing said locking elements from abutment with said tubular toolholder shank.

5. The apparatus according to claim 1 further comprising:
   a means for pushing said tubular toolholder shank forwardly in said bore of said tool support member, said means for pushing reciprocally movably engaged in said stub member and actuated by abutment with said means for actuating.

6. The apparatus according to claim 3 further comprising:
   a means for pushing said tubular shank forwardly in said bore of said tool support member, said means for pushing reciprocally movably engaged in said stub member and actuated by abutment with said means for actuating, when said means for actuating is moved in said second direction.

7. The apparatus according to claim 4 further comprising:
   a means for pushing said tubular shank forwardly in said bore of said tool support member, said means for pushing reciprocally movably engaged in said stub member and actuated by abutment with said means for actuating, when said means for actuating is moved in said second direction.

8. The apparatus according to claim 1 wherein said first radial axis is located forwardly of the rearmost end of said tubular toolholder shank when said tubular toolholder shank is releasably held in the bore of said tool support member.

9. The apparatus according to claim 1 wherein said first radial axis defines a plane perpendicular to the axis of said bore which is forwardly of the rearmost end of said tubular shank when said shank is releasably held in the bore of said tool support member.

10. The apparatus according to claim 1 further comprising:
    a key member mounted in said tool support member and extending into said bore for holding said tubular toolholder shank nonrotatable with respect to said tool support member.

11. A locking mechanism for releasably holding a tubular toolholder shank in the bore of a tool support member, said apparatus comprising:
    a stub member for mounting within said bore and receivable in said tubular toolholder shank;
    said stub member having a passageway therein extending radially along a first radial axis with respect to the longitudinal axis of said bore;
    said stub member having a first aperture and a second aperture circumferentially spaced from said first aperture, and said first and said second apertures radially extending away from the bore wall along a second radial axis and intersecting said passageway;
    a first locking element and a second locking element for releasably abutting with said tubular toolholder shank respectively located in said first and said second apertures;

and a means for actuating said first and said second locking elements through abutment therewith, reciprocally movable along said first radial axis and engaged in said passageway.

12. The locking mechanism according to claim 11 further comprising:

a means for pushing said tubular toolholder shank off said tool support member reciprocally movably engaged in said stub member and actuated by abutment with said means for actuating.

13. The locking mechanism according to claim 11 wherein said first radial axis is located forwardly of the rearmost end of said tubular toolholder shank when said tubular toolholder shank is releasably held in said tool support member.

* * * * *